United States Patent Office 3,763,138
Patented Oct. 2, 1973

3,763,138
PROCESS FOR PREPARING HYDROLYZED MODIFIED GELATIN FOLLOWED BY REACTION WITH DIBASIC ACID ANHYDRIDE
Bohdan Rakoczy, East Brunswick, N.J., assignor to E. I. du Pont de Nemours and Company, Wilmington, Del.
No Drawing. Continuation-in-part of application Ser. No. 219,178, Jan. 19, 1972, which is a continuation-in-part of application Ser. No. 49,167, June 23, 1970, both now abandoned. This application May 31, 1972, Ser. No. 258,362
Int. Cl. C08h 1/06; C09h 3/00; G03c 1/02
U.S. Cl. 260—117                                               10 Claims

ABSTRACT OF THE DISCLOSURE

A method of preparing a hydrolyzed modified gelatin by first hydrolyzing a gelatin in an aqueous solution of a strong acid (pH 0.1–2.0) or a strong base (pH 10.5–13.5) and then modifying the hydrolyzed gelatin by reacting the product from the hydrolysis with a dibasic acid anhydride. The dibasic acid anhydride may comprise an aliphatic, aromatic, cycloaliphatic, cycloolefinic or heterocyclic radical having the anhydride group attached thereto.

CROSS REFERENCE TO RELATED APPLICATIONS

This application is a continuation-in-part of my application U.S. Ser. No. 219,178 filed Jan. 19, 1972, which is in turn a continuation-in-part of my application U.S. Ser. No. 49,167 filed June 23, 1970, both now abandoned.

BACKGROUND OF THE INVENTION

Field of the invention

This invention relates to a process for making modified gelatin compositions. More particularly, it relates to a process making hydrolyzed modified gelatin. These gelatins are useful as binder supplements in silver halide emulsion layers or in layers contiguous thereto to increase the covering power of the emulsion without producing optical haze. The gelatins are also useful in food preparation, or in medical applications or as encapsulating agents.

Description of the prior art

It is known to increase the covering power of gelatino-silver halide emulsions by the substitution of various polymeric materials for part of the gelatino binder. Jennings, U.S. 3,063,838 discloses that covering power of gelatino-silver halide emulsions can be increased by the addition of dextran. The use of dextran, however, tends to produce optical haze. Garrett et al., U.S. 3,272,631 discloses that haze in emulsions containing dextran can be reduced by the addition of alkali metal or ammonium sulfate. C. G. Dostes et al., French Pat. 1,501,821 discloses gelatin subjected to enzyme treatment or enzyme treatment followed by reaction with an acid anhydride can be substituted for up to 50 parts by weight of the total gelatin of a gelatino-silver halide layer to increase covering power. However, the increase in covering power is not comparable to that of emulsions containing dextran.

SUMMARY OF THE INVENTION

It is a primary object of this invention to provide a method for preparing a modified, hydrolyzed gelatin capable of improving certain physical properties of gelatino-silver halide emulsions.

A further object is to provide a modified gelatin suitable for binding light sensitive silver salts and increasing the covering power of gelatino-silver halide emulsions.

A still further object is to provide photographic elements which yield images having increased clarity with reduced haze while wet or dry.

It has now been found that the covering power of a gelatinous silver halide emulsion can be brought to a level at least equal to that of an emulsion containing dextran, without haze and with improved physical properties by the use of a different gelatin derivative.

In the practise of this invention a novel modified hydrolyzed gelatin is prepared by a process which comprises:

(a) Admixing gelatin with an aqueous acid hydrolyzing solution at pH 0.1 to 2.0 or with a basic hydrolyzing solution at pH 10.5 to 13.5;

(b) Heating the admixture at a temperature between 50 and 70° C. for 1 to 2 hours; and (c) Admixing the hydrolyzed gelatin at a pH 10.0–13.5 with at least one dibasic acid anhydride in an amount of 5–20 grams of the latter per 100 grams of hydrolyzed gelatin and heating the admixture at 40 to 55° C. for 1–4 hours. Useful reactants for step (a), above, include those acids which will produce a pH of about 0.1 to 2.0 such as HCl, HF, HBr, HI, $H_2SO_4$, and $HNO_3$ as well as those bases which will produce a pH of about 10.5–13.5 such as NaOH, KOH, LiOH, RbOH and CsOH. The dibasic acid anhydride can be aliphatic, aromatic, cyclo-olefinic, cycloaliphatic or heterocyclic and representative specific radicals include the following, e.g., maleic, diglycolic, phthalic, 1,2,4,5-benzene tetracarboxylic, 1,1-cyclopentane dicarboxylic, 6-chloroisatoic and tetrabromophthalic anhydrides, and tetrahydrofuran-2,3,4,5 tetracarboxylic dianhydride, etc.

When it is desired to prepare the novel gelatin of this invention suitable for incorporation into a gelatino-silver halide emulsion it is necessary to hydrolyse at pH 0.1–1.0, under acid conditions, in order to obtain a final product which, after adjusting the pH to 10–13.5, can be reacted with the dibasic acid anhydride, and will remain in a non-gelled state. However, it is not necessary, when considering a non-photographic use, to fully hydrolyse under acidic conditions. Thus, one can obtain a product which would become gelled, and yet could be ground, dispersed or mixed with or substituted for ordinary gelatin. When used in a photographic emulsion, approximately 5 to 60 grams of the modified hydrolyzed gelatin per 1.5 moles of silver is added to said emulsion just prior to coating or admixed with gelatin for use as a sublayer, antiabrasion layer, or backing layer.

One advantage of the present invention is that emulsions and overcoatings prepared in accordance with it can be applied and dried by ordinary techniques with conventional apparatus. Since aqueous gelatin solutions are used, no volatile solvents are involved necessitating the use of solvent recovery systems.

DESCRIPTION OF THE PREFERRED EMBODIMENTS

When a novel gelatin of this invention is to be incorporated into a silver halide emulsion as a binder supplement or alternatively used in a layer contiguous to said silver halide emulsion the process of preparation is simple. Preferred gelatins are those obtained from animal bones or skins which have a relatively low sulfur content, among other properties, and are particularly suitable for photographic emulsions. The gelatin is added to the water and the acid or base solution in an amount equal to 5 to 50 percent of the total weight of the mixture and allowed to soak for 15–20 minutes. A 0.5 to 0.7 N HCl or a 0.5 to 0.7 N NaOH solution is particularly preferred for hydrolysis. However, any acid solution giving the hydrolysis pH range of 0.1 to 1.0 or any base giving the hydrolysis pH range of 10.5–13.5 under the conditions of hydrolysis herein described may be employed with success equal to HCl or NaOH. Complete melting and uniform dispersion of the gelatin are affected by gradual heating of the mixture between 55 and 60° C. for 1 to 2 hours. In the instance of acid hydrolysis, the pH at this point is usually 0.3 to 1.0, and a pH between 10 and 13.5 is normally incurred when using a base. In the event of acid hydrolysis, the mixture is cooled to 40° C. and the pH adjusted to 10.0 to 13.5 under moderate stirring and a suitable dibasic acid anhydride is then added to the mixture. Said anhydride is added in amount of 5 to 20 grams per 100 grams of gelatin and allowed to react for 1 to 4 hours at about 45–50° C. with moderate stirring.

Useful dibasic acid anhydrides are those having aromatic, cycloaliphatic, heterocyclic structures and various substituted products thereof, having molecular weights of 98 or more.

The preferred anhydrides are diglycolic, succinic, maleic and phthalic acid anhydrides, and 1,2,4,5-benzene tetracarboxylic acid dianhydrides.

Preferred cycloalkanes or cycloalkenes are those comprising the general formula

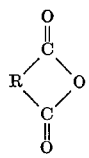

wherein R is a cycloalkane, e.g., 1,1-cyclopentane or 1,1-cyclohexane. Still others may be of the same general formula, wherein R is cyclohexane or cyclohexene having the carbonyls (CO) of the anhydride group attached thereto in cis-1,2 positions, e.g., cis-1,2-cyclohexane dicarboxylic or cis-4-cyclohexene-1,2-dicarboxylic anhydrides.

Long chain substituted succinyl anhydrides such as 1-decenyl and 1-dodecenyl succinic anhydrides are also useful in accordance with the invention.

Also useful in the practice of this invention are certain anhydride derivatives of isatinic acid. Such compounds comprise a nitrogen-containing heterocyclic anhydride group fused on the aromatic ring of the following general formula

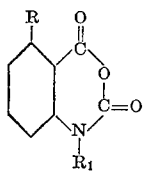

wherein R may be H, Cl, or $NO_2$ and $R_1$ is H or $CH_3$. Preferred compounds of this type are 6-chloroisatoic, 6-nitroisatoic and N-methylisatoic anhydrides.

In addition to tetrahydrofuran 2,3,4,5-tetracarboxylic dianhydride, other preferred heterocyclic compounds useful in the practice of this invention are the 2,5-furandiones such as maleic and citraconic anhydrides.

Upon acid or base hydrolysis and anhydride treatment, the modified gelatins are then incorporated in a conventional gelatino-silver halide emulsion.

Various emulsions may be employed, when practicing this invention. Especially suited are the emulsions of the radiological films disclosed in Jennings, U.S. 3,063,838, Nov. 13, 1962, for medical diagnostic work and films bearing the photolithographic emulsions disclosed in Nottorf, U.S. 3,142,568, July 28, 1964, which can be precipitated as set forth in Moede, U.S. 2,772,165, Nov. 27, 1956, by the organic precipitating agents disclosed therein.

The radiological or X-ray films essentially comprise 25 to 75% silver halide (which is ca. 2 mole percent AgI and ca. 98 mole percent AgBr), 15 to 50% of a suitable conventional gelatin, and 5 to 50% of a preferred modified gelatin.

The above-mentioned gelatin lithographic emulsions and similar light-sensitive compositions applicable in the practice of this invention are those containing silver halide grains which are bromochloride having at least 50 mole percent chloride.

The modified hydrolyzed gelatins of the present invention are also efficient in increasing the covering power of conventional negative emulsions. These light-sensitive compositions such as panchromatic emulsions have in addition to various conventional ingredients approximately 7.0 mole percent of silver iodide and 93 mole percent silver bromide and 110 grams per unit of gelatin binder.

In the emulsions described the gelatin binder may comprise 5 to 50% of said modified hydrolyzed gelatin and may also contain from 1 to 10% of a homopolymer or copolymer of an acrylic acid ester and homopolymer of an α hydrocarbon substituted acrylic acid ester. The acrylic or alkacrylic esters may also be copolymerized with other unsaturated monomers, e.g., vinylidene halides.

The silver halides are precipitated in gelatin and the resulting dispersion is ripened, coagulated and washed. The emulsion is then redispersed and it is digested to bring it to maximum speed and finally prepared for coating.

The modified hydrolyzed gelatin can be incorporated with the gelatin silver halide at any stage after precipitation of the silver halide grains in the gelatin but is preferably admixed after the digestion step. The sensitized emulsion is coated on a suitable support and dried in the usual manner. To test the effectiveness of the modified gelatin a conventional sensitometer with neutral density $\sqrt{2}$ step wedge and a hazemeter are used and results based on readings therefrom calculated. In the following examples covering power is calculated, when the density of a selected step is measured and divided into the quantity of developed silver in grams per square decimeter determined by analysis. Haze is measured on a Gardner hazemeter as the percentage of light scattered more than a few degrees from the transmitted beam. Details of the instrument design and the test procedure are found in ASTM D1003–61, "Haze and Luminous Transmittance of Transparent Plastics."

The photographic emulsions containing the novel gelatins of this invention may be coated on one or both sides of any suitable support such as cellulose acetate, triacetate, or mixed esters, or of polymerized vinyl compounds such as vinyl acetate or vinyl chloride, and polystyrene and polymerized acrylates may also be used. A particularly useful transparent support is polyethylene terephthalate prepared and subbed as disclosed in Alles, U.S. 2,779,684, Example IV. Polyester films are particularly suitable because of their dimensional stability but any common, well-known photographic support may be used.

In addition to the hydrolyzed and modified gelatin of this invention one may include suitable hardeners, antifoggers, coating and wetting aides, etc. In addition, dyes and/or other sensitizers may be added as befits the emulsion to be used and as well known to those skilled in the photographic emulsion making art.

Additionally, these new and novel hydrolysed and modified gelatins may be useful in other applications where gelatin is now used and where their solubility or gelling characteristics may make them more desirable than gelatin. When preparing the gelatin derivatives of this invention for use other than as a photographic silver halide binding agent it is not necessary to carry out the acidic hydrolysis step at pH 0.1–1.0 but one can advantageously hydrolyse between pH 0.1 to 2.0. The final product will become gelled on standing but viscosity measurements indicate that the product is substantially different from that of gelatin alone or any hitherto known reaction product of gelatin. Thus, our new and novel gelatins may be used, for example, in the pharmaceutical industry for example an encapsulating agent for medicinal preparations. Our hydrolysed and modified gelatin may be substituted for part or all of the gelatin which, because of improved solubility, would provide certain advantages. Again, there is widespread use of naturally occurring gelatin for all sorts of food preparations. Our formulations may be used as a partial or total replacement here and, because of improved water solubility and gelling tendencies, provide advantages over natural gelatin. Thus, wherever natural gelatin is used as a binder, mixer or extender one may replace some or all of said gelatin with our hydrolyzed and modified gelatins.

The invention will now be further illustrated by, but is not to be limited to, the following examples. The quantities of modified hydrolyzed gelatin are given as a percentage of the weight of total solids, in the binder. The ratio of gelatin to silver halide is approximately 1 to 2.5.

EXAMPLE I

A high speed gelatino-silver iodobromide emulsion containing approximately 1.6 mole percent silver iodide and 98.4 mole percent silver bromide was precipitated and washed as described in Moede, U.S. 2,772,165 and further prepared as described in Jennings, U.S. 3,063,838 except that no dextran was added. Following redispersion and sensitization with gold and sulfur as taught in the above Jennings patent, the emulsion was divided into two equal portions. To the first portion was added 40 grams per 1.5 moles of silver halide of a gelatin which had been modified as follows:

To a solution comprising 5.0 liters of distilled water and 5.0 liters of 1.2 N hydrochloric acid solution there was added 2500 grams of a low sulfur content bone gelatin. The mixture was allowed to soak until all of the gelatin particles became saturated with the acidic solution. Hydrolysis was achieved, when the temperature was gradually increased to and maintained at 55–60° C. for 2 hours. The homogeneous mixture was cooled to 40° C. and the pH was adjusted to 7.0 by the addition of 20% potassium hydroxide solution. Said mixture was then refrigerated for 36 hours. The gelled substance obtained was remelted at 40° C., and the pH was adjusted to 10.5 by the addition of 342 ml. of 20% potassium hydroxide. There was added to the alkaline mixture 125 grams of diglycolic anhydride. The anhydride was reacted with the hydrolyzed gelatin under moderate stirring at 45–50° C. for 2 hours.

To the second portion of the above emulsion there was added 40 grams per 1.5 moles of silver halide of dextran, such as is disclosed in the above Jennings patent. This later portion of emulsion served as control. Both emulsions were then coated separately on both sides of a polyethylene terephthalate film which was prepared and subbed as disclosed in Alles, U.S. 2,779,684, Example IV. After drying and overcoating the emulsion coatings with a thin stratum of gelatin, the dried films were found to contain approximately 150 milligrams of silver halide per dm.² Strips from each of the above coatings were then given a 5 second exposure through an aluminum $\sqrt{2}$ step wedge in an X-ray machine after which they were developed for 30 seconds in a standard p-N-methylaminophenol hydrosulfate/hydroquinone X-ray developer, fixed in a standard sodium thiosulfate bath, washed and dried. Film quality was determined. Comparative results are as follows:

| Sample | Speed | Coating weight (mgs./dm.²) | Covering power | Dry haze |
|---|---|---|---|---|
| Modified emulsion | 238 | 142.6 | 42.7 | 8.3 |
| Control | 225 | 148.5 | 42.1 | 14.1 |

EXAMPLES II–III

Additional amounts of X-ray type silver iodobromide emulsions similar to those taught in Jennings, U.S. 3,063,838 without dextran but having a prescribed amount of a preferred base hydrolyzed and anhydride-modified gelatin were prepared. In this instance each of two different samples of suitable gelatin were treated with 0.5 N sodium hydroxide solution and reacted with maleic anhydride as follows:

To each solution comprising 4.0 liters of distilled water and 4.0 liters of 1.0 N sodium hydroxide there was added 2500 grams of a low sulfur content, bone gelatin. The mixtures were stirred at 55–60° C. for approximately 2 hours and cooled to 40° C. at which point the pH of sample 1 was found to be 11.70 while that of sample 2 was found to be 12.60. Said solutions were then slowly heated to 45–50° C. and reacted with 125 grams of maleic anhydride for 2 hours with moderate stirring. The respective pH's of the samples were adjusted to 6.4 by the addition of 880 and 950 milliliters of 1.2 N hydrochloric acid. Shortly thereafter, the modified hydrolyzed gelatins were incorporated in the aforementioned sensitized emulsions in an amount of 40 grams of dried material per 1.5 moles of silver halide, coated and processed in the usual manner. Using similar emulsions with about 20 grams of dextran per 1.5 moles of silver halide as controls, sensitometry of the samples was evaluated as presented below.

| Sample | Speed | Coating weight (mgs./dm.²) | Covering power at density of 1.5 | Dry haze |
|---|---|---|---|---|
| 1 | 254 | 151 | 40.3 | 8.4 |
| Control | 213 | 157 | 39.2 | 15.3 |
| 2 | 289 | 153 | 41.2 | 8.8 |
| Control | 252 | 154 | 39.4 | 15.0 |

EXAMPLES IV–V

A sufficient quantity of a dextran-free sensitized emulsion such as that described in Example I was divided into three equal portions, A, B and C to be modified, coated, processed and compared for photographic properties with a standard film. A 20% solution of a modified hydrolyzed gelatin equivalent to 40 grams of solids per 1.5 moles of silver halide of the type embodying this invention was admixed with A, and to B there was added approximately 70 grams per 1.15 moles of silver halide of a gelatin derivative similar to that taught in Example IV of Dostes et al., French Pat. 1,501,821.

The modified gelatin mixed with sample A was prepared as follows:

There was added to 7.5 liters of distilled water and 2.5 liters of 1 N hydrochloric acid 2500 grams of a low sulfur content gelatin. The mixture was allowed to soak until the gelatin particles became saturated with the acid solution. A pH of 1.20 was recorded. Following slow stirring and heating at 55–60° C. for 4 hours, the homogeneous viscous liquid was cooled and maintained at 40° C. as the pH was adjusted to 7.0 by addition of 1050 ml. of a 20% potassium hydroxide solution. The hydrolyzed gelatin solution was refrigerated for 24 hours. The gelled substance obtained therefrom was remelted and held at 40° C. while the pH was adjusted to 10.5 with 300 ml. of 20% potassium hydroxide solution. After heating said solution to 45–50° C., there was added 250 grams of phthalic anhydride. Said hydrolyzed solution and anhydride were reacted at the said temperature for 4 hours under constant stirring. The pH of the modified hydrolyzed gelatin was adjusted to 6.4 with the addition of a hydrochloric acid solution under constant, slow stirring. Said modified gelatin having 20% solid material was then added to the sensitized emulsion in an amount of 40 grams per 1.5 moles of silver halide.

The enzyme treated gelatin was approximately 70 grams per 1.15 moles of silver halide.

The standard emulsion, sample C, which served as a control comprised an emulsion similar to that taught in Jennings, U.S. 3,063,838 having dextran therein.

The emulsions were coated and processed in the manner discussed above. Sensitometric and physical data obtained therefrom are set forth below.

| Sample | Speed | Coating weight | Covering power at density of 1.5 | Dry haze |
|---|---|---|---|---|
| A | 269 | 150 | 41.8 | 8.3 |
| B | 170 | 172 | 32.6 | |
| C (control) | 223 | 154 | 40.8 | 19.1 |

EXAMPLE VI

A quantity of high contrast silver iodobromide emulsion having a composition similar to that disclosed in Cohen et al., U.S. 3,203,804 without dextran and made in the manner taught in Moede, U.S. 2,772,165 was prepared. The emulsion was digested in the presence of the usual chemical sensitizers and carbocyanine dyes to provide panchromatic sensitivity. At the end of digestion, the emulsion was divided into three parts henceforth identified as samples A, B, and C which were freed of unwanted soluble salts by conventional photographic washing procedures. There was admixed with the emulsion of sample A, in addition to the 200 grams of binder gelatin, 30 grams of gelatin modified in the following manner: Said gelatin was hydrolyzed with 0.5 N sodium hydroxide solution and modified with maleic anhydride as discussed in Examples IV and V prior to being admixed with the emulsion. In a similar manner there was added to emulsion B in addition to the 200 grams of the bone gelatin, 30 grams of dextran per 1.5 moles of silver halide. Using sample C with 230 grams of bone gelatin per 1.5 moles of silver as a control, the photosensitive emulsions were then coated on polyethylene terephthalate strips exposed and developed in a standard methyl-para-aminophenol hydrosulfate and hydroquinone developer for 3 minutes, rinsed, fixed in conventional sodium thiosulfate and washed. Immediately thereafter, the haze was measured as previously described. The film samples were then dried and the sensitometric properties evaluated with the following results:

| Sample | Speed | Coating weight (mgs./dm.²) | Covering power | Wet haze |
|---|---|---|---|---|
| A | 184 | 88 | 63.3 | 33.7 |
| B | 219 | 86 | 61.3 | 43.6 |
| C (Control) | 192 | 87 | 61.3 | 35.3 |

EXAMPLE VII

A gelatino-silver iodobromide emulsion useful for high speed reversal photographic elements was prepared in the aforementioned manner without dextran. In this instance, a mixture which contained 2.5 mole percent of iodide, 97.5 mole percent of bromide and 25 grams of approximately 11.6% of bone gelatin based on the weight of 1.5 moles of silver halide was precipitated as an insoluble complex of the gelatin and o-sulfobenzaldehyde polyvinyl acetal containing the entrapped silver halides and gelatin from which the residual, soluble salt were decanted by the process disclosed in Moede, U.S. 2,772,165. To the coagulant there was added approximately 75 grams of gelatin per 1.5 moles of silver halide. Then said coagulant was treated with an alkaline solution, slowly heated, redispersed and maintained at 110° F. for 15 minutes. At this point, the mixture was cooled to 95° F., and the pH was adjusted to 6.3. Said emulsion was then digested at 116–120° F., cooled and divided into parts which are henceforth identified as samples 1, 2, 3, and 4. To samples 3 and 4 with certain conventional ingredients there was admixed enough of a 20% aqueous solution of dextran having an average molecular weight of about 45,000 to give each sample having 1.5 moles of silver halide an additional 17 grams of dextran. In a similar manner there was admixed with samples 1 and 2 along with the additional ingredients 24 grams (100% solids) per 1.5 moles of silver halide of a modified hydrolyzed gelatin prepared in the manner described in Examples II and III. Upon adjusting the pH of the four samples, to about 6.2, the sensitized emulsions were then coated on polyethylene terephthalate films and dried in a conventional manner. The coated films were exposed in a sensitometer equipped with a neutral density $\sqrt{2}$ step wedge and processed in conventional solutions e.g., black and white bleach and clearing baths between first and second developments prior to fixation in a standard acidic, thiosulfate fixer and final washing. The coating weight, covering power, haze, and particular sensitometric results obtained therefrom are shown in the following table.

| Sample | Mod. gel. added | Relative speed | Coating weight (mgs. AgBr/dm.²) | Covering power | Dry haze |
|---|---|---|---|---|---|
| 1 | Yes [1] | 100 | 88 | 42.85 | 2.0 |
| 3 (Control) | No | 100 | 89 | 32.95 | 8.6 |
| 2 | Yes [2] | 101 | 102 | 44.45 | 2.4 |
| 4 (Control) | No | 99 | 107 | 32.95 | 4.7 |

[1] From Ex. II. [2] From Ex. III.

EXAMPLE VIII

An experiment designed specifically to demonstrate increased covering power when using an antiabrasion coating having a modified hydrolyzed gelatin and a modified or standard emulsion over that wherein both components are standard was conducted as follows:

A gelatino-silver iodobromide emulsion useful in X-ray systems was prepared in the manner described in Example I without dextran or any gelatin of the type embodying this invention. The emulsion contained approximately 1.6 mole percent of silver iodide and 98.4 mole percent of silver bromide, 40 percent based on the total solid weight per 1.5 moles of silver halide, bone gelatin and the usual ingredients. Following digestion, the emulsion was divided into four parts identified henceforth as samples 1, 2, 3 and 4. To samples 1 and 3 there was added enough of a 20% aqueous solution of dextran similar to that employed in Example I to give each sample about 20 grams of dextran per 125 grams of gelatin. To emulsions 2 and 4 there was added an aqueous solution of a modified hydrolyzed gelatin prepared in the manner described in Examples II and III in an amount sufficient to give each emulsion an additional 40 grams per 1.5 moles of silver halide. The emulsions were then coated on polyethylene terephthalate supports and dried in a conventional manner. Shortly thereafter the coated films bearing emulsions 1 and 2 were overcoated with a 2.2% aqueous bone gelatin antiabrasion solution of the type disclosed in Meerkamper, U.S. 3,058,826 having about 9 milligrams of formaldehyde per gram of gelatin. Said antiabrasion solutions contained, in addition to the standard salt solutions and solvents, 200 grams of gelatin and were coated to give a dry coating weight of about 9 milligrams of gelatin per square decimeter.

To the remaining coated films bearing emulsions 3 and 4 there was applied a 2.2% gelatino-aqueous abrasion solution of which 25% of the total gelatin was of the modified hydrolyzed type described in Examples II and III. In this instance, a sufficient quantity of a 20% solution of the gelatin embodying this invention was added to the abrasion solution to give 50 grams (100% solids) of the modified gelatin per 150 grams of the bone gelatin. The dried films having an antiabrasion overcoat of approximately 9 milligrams of gelatin per dm.² were then exposed to a low intensity X-ray and processed as described in Example I. Using the film with sample 1 as a control, the sensitometric data and covering power were compared. The results according to the respective emulsion with the particular antiabrasion composition applied thereon are shown in the following table:

| Sample | Modified gelatin | | Speed | Covering power |
|---|---|---|---|---|
| | In emulsion | In abrasion | | |
| 1 (Control) | None | None | 195 | 43.4 |
| 2 | Yes [1] | do | 228 | 50.7 |
| 3 | None | Yes [1] | 208 | 45.7 |
| 4 | Yes [2] | Yes [2] | 236 | 57.1 |

[1] From Ex. II.  [2] From Ex. III.

EXAMPLE IX

Using similar apparatus and repeating the procedure described in Examples II–III, another modified, hydrolyzed gelatin was prepared for use in a high speed gelatino-silver iodobromide emulsion of the type disclosed in Example I. In this instance, portions of base hydrolyzed gelatin were reacted with maleic and succinic anhydrides for comparison of the same, when incorporated in a low binder gelatino-silver halide emulsion to improve certain properties thereof, and a conventional emulsion having dextran therein as follows:

To 1600 ml. of a 0.5 N sodium hydroxide solution there was added 400 grams of a low sulfur content, bone gelatin. The mixture was stirred at 55–60° C. for approximately 1 hour and cooled to 40° C. at which point a pH of 12.42 was recorded. Said mixture was then divided into two parts, A and B, of which B was one-third A. To part A then was added 19.8 g. of maleic anhydride which was reacted with the hydrolyzed gelatin for 1 hour at 45–50° C. under moderate stirring. A pH of 10.36 was then adjusted to 6.1 with 55 ml. of a 3.0 N hydrochloric acid solution. To part B there was added 6.7 g. of succinic anhydride. Following reaction for 1 hour at 45–50° C., a pH of 10.96 was adjusted to 6.1 with 16 ml. of 3.0 N hydrochloric acid.

Shortly thereafter, the modified gelatins were incorporated in sensitized emulsions of the aforementioned type in the amounts of 40.0 grams of dried material per 1.5 moles of silver halide, coated and processed in the usual manner. Using similar emulsions with about 20 grams of dextran per 1.5 moles of silver halide as controls, particular sensitometric results and physical properties were evaluated as presented below.

| Sample | Anhydride used | Speed | Coating weight [1] (mgs./dm.²) | Covering power | Dry haze |
|---|---|---|---|---|---|
| A | Maleic | 228 | 67 | 50.7 | 6.4 |
| B | Succinic | 240 | 73 | 52.2 | 7.9 |
| Control | None | 195 | 75 | 43.4 | 9.9 |

[1] Emulsion coated on one side only.

EXAMPLE X

Example VIII was repeated except to emulsion samples 2 and 4 there was added enough of an aqueous solution of a modified hydrolyzed gelatin prepared in the manner described in Example IX to give each emulsion an additional 40 grams per 1.5 moles of silver halide. Accordingly, emulsion samples 1 and 3 were similar to those of Example VIII having about 20 grams of dextran per 125 grams of gelatin therein. Using polyethylene terphthalate supports, emulsion coating and drying operations were repeated. Shortly thereafter, the coated films bearing emulsions 1 and 2 were overcoated with 2.2% aqueous bone gelatin antiabrasion solution of the type disclosed in Meerkamper, U.S. 3,058,826 having about 9 milligrams of formaldehyde per gram of gelatin. Said antiabrasion solutions contained, in addition to the standard salt solutions and solvents, 200 grams of gelatin and were coated to give a dry coating weight of about 9 milligrams of gelatin per square decimeter.

To the remaining coated films bearing emulsions 2 and 4 there was applied a 2.2% gelatino-aqueous abrasion solution of which 25% of the total gelatin was of the modified hydrolyzed type described in Example IX, sample B. In this instance, sufficient quantity of a 20% solution of the gelatin embodying this invention was added to the antiabrasion solution to give 50 grams (100% solids) of the modified gelatin per 150 grams of the bone gelatin. The dried films having an antiabrasion overcoat of approximately 9 milligrams of gelatin per dm.² were then exposed to a low intensity X-ray and processed as described in Example I. Using the film with emulsion 1 as a control, the sensitometric data and covering power were compared. The results according to the respective emulsion with the particular antiabrasion composition applied thereon are shown in the following table.

| Sample | Modified gelatin | | Speed | Covering power |
|---|---|---|---|---|
| | In emulsion | In abrasion | | |
| 1 (Control) | No | No | 195 | 43.4 |
| 2 | Yes | No | 228 | 57.1 |
| 3 | No | Yes | 208 | 45.7 |
| 4 | Yes | Yes | 180 | 47.8 |

It becomes apparent that use of a gelatin antiabrasion overcoating having a modified hydrolyzed gelatin therein, when applied to a film bearing a photosensitive emulsion, results in increased covering power without detrimental affect on sensitometric characteristics.

EXAMPLE XI

In order to demonstrate that gelatin may be modified by the process of this invention utilizing acid or base solutions giving the desired pH ranges, samples of low sulfur content bone gelatin were soaked in the acid or base solutions shown below until the gelatin became saturated with the solution. The temperature of the solution was then raised slowly until 55–60° C. was reached and held there for about 2 hours when hydrolysis was achieved. The mixtures were then cooled and the pH of the acid solutions adjusted to 7.0 by the addition of base and these solutions then cooled and refrigerated to gel the mixtures. After gelling, each of the acid prepared mixtures were remelted at 40° C. and the pH adjusted to about 10.5 by further addition of base. Those mixtures which had been hydrolyzed under basic conditions were further modified with the dibasic acid anhydride at the pH which had been achieved during the particular hydrolysis. Each of the above mixtures (whether acid or base hydrolyzed) was then reacted with either succinic or diglycolic anhydride following reaction conditions as has been previously described. Viscosity measurements taken on both the hydrolyzed mixtures and later on the mixtures after reaction with the dibasic acid anhydride clearly indicate the vast difference over that of a simple gelatin solution of the same percent of solids. All of these elements were later incorporated into the silver halide emulsion of Example I at the same ratios and conditions, subsequently coated on polyethylene terephthalate film base, dried, and strips from these coatings exposed, developed, fixed, washed and dried as described therein. All of these samples effectively increased the covering power of the emulsion while producing lower haze when compared to controls having dextran contained therein.

Results are as follows:

| Hydrolysis step | | | Modification step | | Sensitometry | | |
|---|---|---|---|---|---|---|---|
| | pH of hydrolysis | Viscosity (centistokes) | Anhydride used | Viscosity (centistokes) | Speed | Covering power | Remarks |
| (a) Base hydrolysis: | | | | | | | |
| None—unhydrolyzed gelatin | | 93.0 | | | | | Gelled. |
| Dextran control | | | | | 326 | 46.0 | |
| NaOH | 12.87 | 4.5 | Succinic | 4.25 | 343 | 47.5 | Does not gel. |
| KOH | 12.90 | 4.0 | do | 3.6 | 341 | 62.0 | Do. |
| KOH | 12.90 | 4.0 | Diglycolic | 3.7 | | | Do. |
| LiOH | 12.0 | 9.2 | Succinic | 11.2 | 357 | 46.5 | Do. |
| LiOH | 12.0 | 9.2 | Diglycolic | 12.1 | 431 | 47.8 | Do. |
| (b) Acid hydrolysis: | | | | | | | |
| Dextran control | | | | | 241 | 40.2 | |
| HCl | 0.40 | 5.1 | (¹) | 8.9 | 222 | 43.0 | Do. |
| HCl | 0.40 | 5.1 | Succinic | 8.87 | | | Do. |
| HI | 0.60 | 3.8 | do | 4.1 | | | Do. |
| $HNO_3$ | 0.30 | 3.0 | do | 3.2 | 302 | 46.3 | Do. |
| $H_2SO_4$ | 0.40 | 4.5 | do | 5.8 | 339 | 47.0 | Do. |
| $CH_3CO_2H$ | 2.9 | 32.0 | do | 13.5 | | | Gelled. |

¹ Tetrahydrofuranedianhydride used here.

From this example it is obvious that one can complete the hydrolysis step with a number of strong bases or acids at pH 10.5–13.5 or pH 0.1–2.0 and obtain satisfactory results.

What is claimed is:

1. A process for preparing a modified hydrolyzed gelatin comprising the steps of:
   (a) admixing gelatin with an aqueous hydrolyzing solution selected from the group consisting of acid hydrolyzing solutions having a pH of about 0.1 to about 2.0 and a basic hydrolyzing solution having a pH of about 10.5 to about 13.5;
   (b) heating the admixture at a temperature between 50 and 70° C. for 1 to 2 hours; and
   (c) admixing the hydrolyzed gelatin at a pH 10.0–13.5 with at least one dibasic acid anhydride in an amount of 5–20 grams of the latter per 100 grams of hydrolyzed gelatin and heating the admixture at 40 to 55° C. for 1–4 hours.

2. The process of claim 1 where said hydrolyzing solution is an acid hydrolyzing solution with a pH of about 0.1 to about 1.0.

3. The process of claim 1 wherein said hydrolyzing solution is an acid hydrolyzing solution with a pH of about 0.1 to about 1.0 formed from acids selected from the group consisting of HCl, HF, HBr, HI, $H_2SO_4$ and $HNO_3$.

4. The process of claim 1 wherein said hydrolyzing solution is a basic hydrolyzing solution wtih a pH of about 10.5 to about 13.5 selected from the group consisting of NaOH, KOH, LiOH, RbOH and CsOH.

5. The process of claim 1 wherein said dibasic acid anhydride comprises a structure having the anhydride group attached to it and the structure is selected from the group consisting of aliphatic, aromatic, cycloalkyl, cycloolefinic and heterocyclic structures.

6. The process of claim 1 wherein said dibasic acid anhydride is selected from the group consisting of maleic acid anhydride, diglycolic acid anhydride, phthalic acid anhydride, 1,2,4,5-benzene tetracarboxylic acid anhydride, 1,1-cyclopentane dicarboxylic 6-chloroisatoic acid anhydride, tetrabromophthalic acid anhydride and tetrahydrofuran-2,3,4,5 tetracarboxylic acid dianhydride.

7. The process of claim 1 wherein said hydrolyzing solution is a 0.5 to 0.7 N sodium hydroxide hydrolyzing solution with a pH of about 10.5 to about 13.5.

8. The process of claim 1 where said hydrolyzing solution is a 0.5 to 0.7 N hydrochloric acid hydrolyzing solution with a pH of about 10.5 to about 13.5.

9. The process of claim 1 wherein said hydrolyzing solution contains 20 to 45% by weight of gelatin.

10. A process for preparing a gelatin solution comprising mixing the modified hydrolyzed gelatin of claim 1 with an unmodified aqueous solution of gelatin.

References Cited

UNITED STATES PATENTS

| 2,525,753 | 10/1950 | Yutzy et al. | 260—117 |
| 2,614,929 | 10/1952 | Yutzy et al. | 260—117 X |
| 2,614,930 | 10/1952 | Lowe et al. | 260—117 X |
| 3,615,626 | 10/1971 | Doste et al. | 96—114.8 |
| 2,956,880 | 10/1960 | Gates | 96—114.8 |
| 3,108,995 | 10/1963 | Tourtellotte | 260—117 |
| 3,118,766 | 1/1964 | Roth | 96—114.8 |

OTHER REFERENCES

Encyclopedia of Chem. Technology, vol. 10, 1966, p. 505, Kirk et al.

Chem. Abstracts, vol. 72, 1970 (effective date June 1969, Rutkin et al.

HOWARD E. SCHAIN, Primary Examiner

U.S. Cl. X.R.

96—114.8; 99—18; 106—125